INVENTORS.
ANTHONY M. APICELLA, JR.
NORMAN L. BOLING
JOHN T. FRANKS JR.
BY
A H Oldham
ATTORNEY INVENTORS.
ANTHONY M. APICELLA, JR.
NORMAN L. BOLING
JOHN T. FRANKS, JR.
BY
A. A. Oldham
ATTORNEY INVENTORS.
ANTHONY M. APICELLA, JR.
NORMAN L. BOLING
JOHN T. FRANKS, JR.
BY [signature]
ATTORNEY United States Patent Office 3,425,046

Patented Jan. 28, 1969

3,425,046

EXTERNALLY BIASED HIGH SPEED NON-DESTRUCTIVE MEMORY DEVICE

Anthony M. Apicella, Jr., Massillon, Norman L. Boling, Cuyahoga Falls, and John T. Franks, Jr., Akron, Ohio, assignors to Goodyear Aerospace Corporation, Akron, Ohio, a corporation of Delaware Filed Sept. 23, 1964, Ser. No. 398,627

U.S. Cl. 340—174 5 Claims

Int. Cl. G11b 5/14

ABSTRACT OF THE DISCLOSURE

This invention relates to a memory element, and more particularly to a single aperture memory element utilized in a digital memory storage system wherein words comprising bits of information may be stored in individual elements which have a short section thereof externally biased in a direction substantially perpendicular to the flux path thereof by a uniform permanent magnetic field, and which elements can be read out repetitively by measuring flux changes in the short externally biased section to determine the "Equal OR" or "Equality" logical function during an associative memory operation without destroying the stored information.

This invention relates to a memory element, and more particularly to a memory element utilized in a digital memory storage system wherein words comprising bits of information may be stored in individual magnetic memory elements which are externally biased by a permanent magnetic field, and which elements can be read out repetitively during an associative memory operation without destroying the stored information.

Heretofore, the use of standard toroidal cores in digital memory storage systems has been well known. Further, the technique of cross-field switching to achieve a non-destructive readout of the information stored in the core has been well known. However, the crossfield switching technique has not been adapted to provide the "Exclusive OR" or "Equality" functions with a single simple toroidal core. A system of this type is needed to provide the associative memory function.

Heretofore it has been known that present day digital computers, series or parallel, are basically word oriented machines. Arithmetic or logical operations, along with memory, are sequenced by function and the computer solves all problems on a word by word basis. When restricted to this mode of operation communication in existing digital systems is still relative fast. However, some standard logical operations such as table lock-up or memory search routines create several problems for existing digital systems because some definite, but unknown memory location is desired. Usually, in order to achieve the desired location the computer is sequenced through all or some portion of memory until the desired logical operation is achieved. Therefore, with increasingly larger memory systems, memory searching time becomes prohibitively long. In the ever changing and complex world of today, it is extremely important that information stored in memory should be located accurately and in the shortest possible time. With the conventional computer, time to locate a desired word stored in memory depends upon the logical approach to the problem.

Heretofore, patent application Ser. Nos. 280,391, now U.S. Patent No. 3,300,760; 280,602, now U.S. Patent No. 3,300,761; and 382,221 all assigned to Goodyear Aerospace Corporation, and relating to associative memory operations in a digital computer have been submitted. However, these associative memory systems involve utilization of a multi-aperture logic element, a torodial core, and a waffle iron storage element, respectively, which systems are extremely difficult to make in a small size because of wiring problems, which systems have greater power requirements for operation, some of which systems have fairly long time requirements for operation, relative to the system disclosed hereinafter, but much better than the prior art, and which systems require much closer and more accurate voltage and current controls. Hence, an associative memory system which will be small in size, low in construction costs, rapid in operation, and extremely accurate is needed to keep pace with the requirements of the art.

Therefore, it is the general object of the present invention to avoid or overcome the foregoing and other difficulties of and objections to prior art practices by the provisions of a digital memory storage apparatus adapted for an associative memory system which storage apparatus utilizes a plurality of toroidal cores made of a highly permeable magnetic material whereby cross-field switching techniques are utilized in the presence of an externally applied magnetic field which provides greater sensing outputs for less current application, and which substantially reduces the time required to conduct an interrogation.

A further object of the invention is to provide a memory storage unit which utilizes toroidal cores, each storing a bit of information, where the "Exclusive OR" or "Equality" function may be performed on each core because each core is externally biased with an external non-toroidal magnetic field.

Another object of the invention is to provide an associative memory device utilizing square loop ferrite single aperture cores for information bit storage elements with substantially conventional write in circuitry, substantially conventional interrogate and sensing circuitry, but where a permanent non-toroidal magnetic field is applied to each core to greatly increase core output and signal to noise ratio in the non-destructive mode and decrease write and read out time in the destructive mode.

A further object of the invention is to provide an associative memory device utilizing a novel and improved core application which is highly effective in operation, small in size, low in cost, and easy to construct.

The aforesaid objects of the invention and other objects which will become apparent as the description proceeds are achieved by providing in a digital memory storage system the combination of a base plate made from a permanent magnet to project a non-toroidal magnetic field, a plurality of square looped single aperture cores arranged in aligned columns and rows on the base plate, means to carry a current to individually set a desired flux pattern representing a bit of information into each core, interrogate winding means on each core to place a solenoidal interrogate magnetic field around each core so the field lies in a plane substantially parallel to the magnetic field of the base pate, means to sense flux changes in each core in a plane substantially parallel to the plane of the interrogate magnetic field, and means to detect the direction of flux change in the plane of the core substantially parallel to the plane of the interrogate magnetic field.

According to the method of the invention, the invention contemplates providing an associative memory utilizing a plurality of square hysteresis loop, single apertured cores which are aligned in columns and rows representing bits of information so that each row represents a word and each column represents corresponding bits of every word where the cores are mounted onto a permanent magnetic plate which includes the steps of writing words into memory by individually setting desired flux patterns in each core, placing a compare word in memory so that its bits are aligned with the columns of cores, sequentially pulsing an interrogate current through each column of aligned cores to create an interrogate magnetic field substantially parallel to the field of the magnetic base plate which interrogate current is in a direction as determined by the information of the corresponding bit of the compare word, simultaneously with each sequential interrogate current pulse recording the direction of any flux pattern changes in a plane perpendicular to the magnetic field of the base plate in each core having the interrogate current pulsed therethrough, analyzing the information received from the flux changes noted in each core, and determining which words in memory have all bits in agreement with the corresponding bits of the compare word after all columns of bits have been sequentially pulsed with the interrogate current.

For a better understanding of the invention reference should be had to the accompanying drawings wherein.

Figure 1:
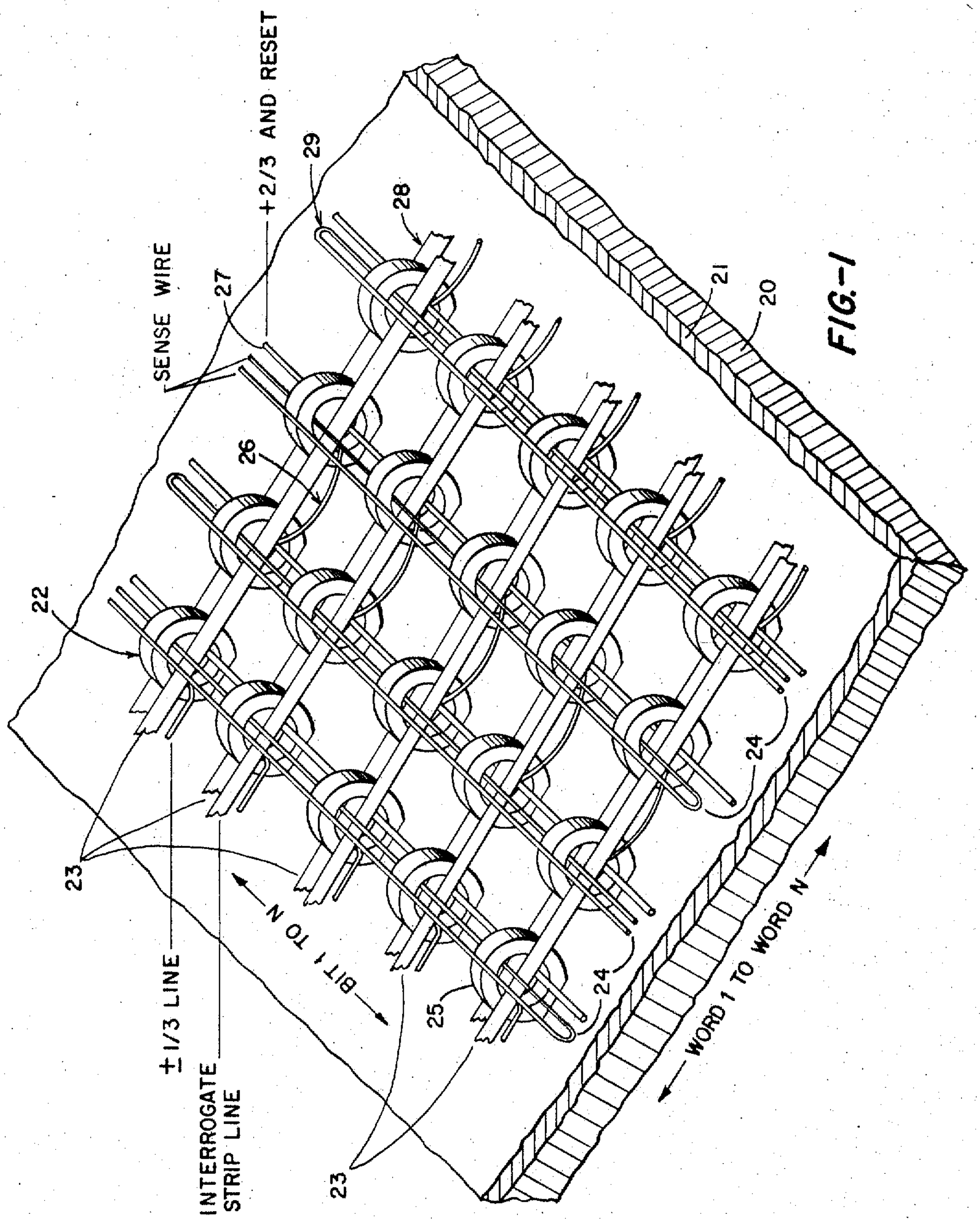
FIGURE 1 is a broken away perspective view of the core structure of a preferred embodiment of a memory storage unit of the invention.
Figure 3:
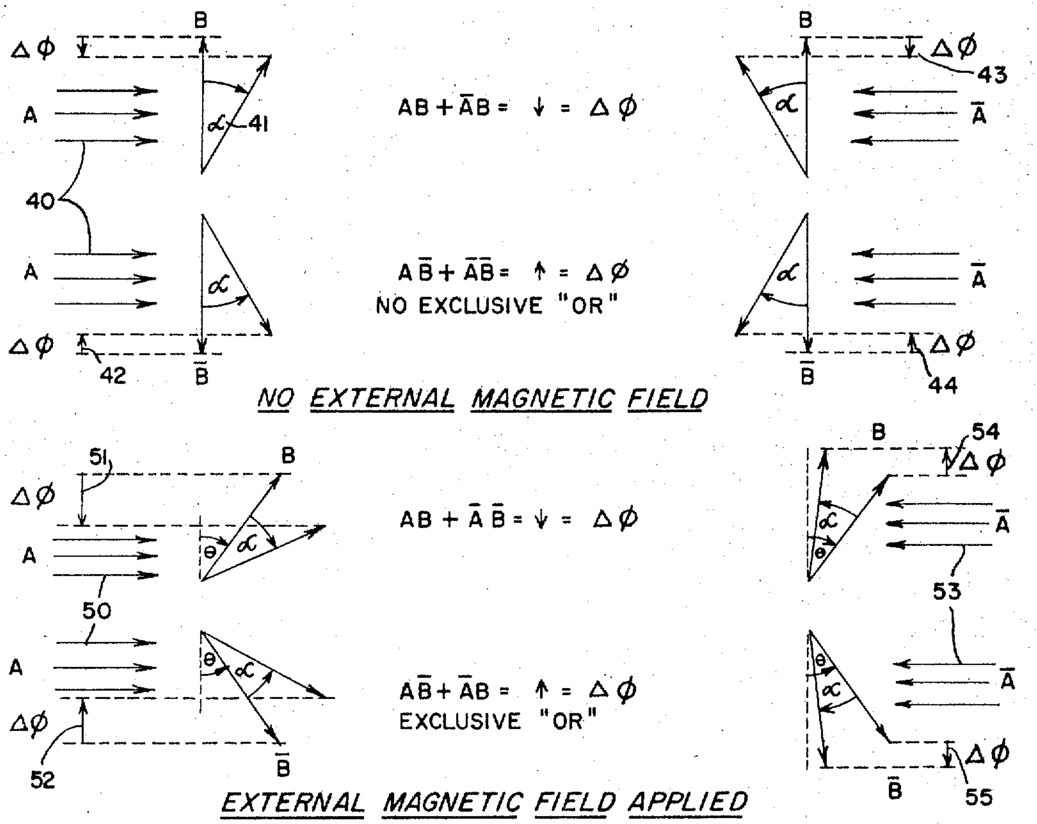
Figure 2:
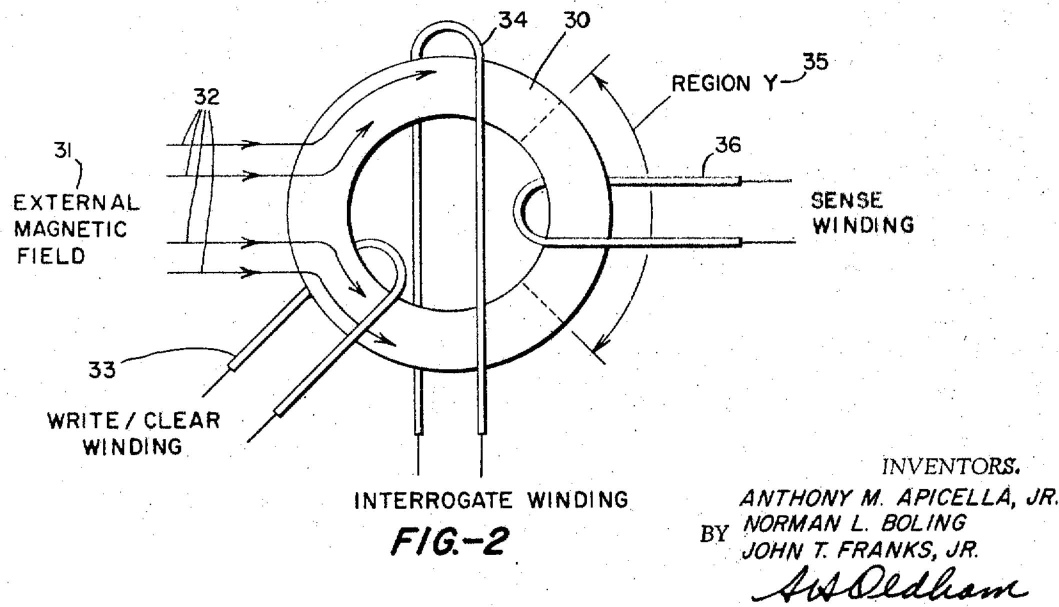
FIGURE 2 is an enlarged schematic illustration of one of the toroidal cores of FIGURE 1 showing the relationship of the flux patterns therein and the windings therearound.
Figure 4:
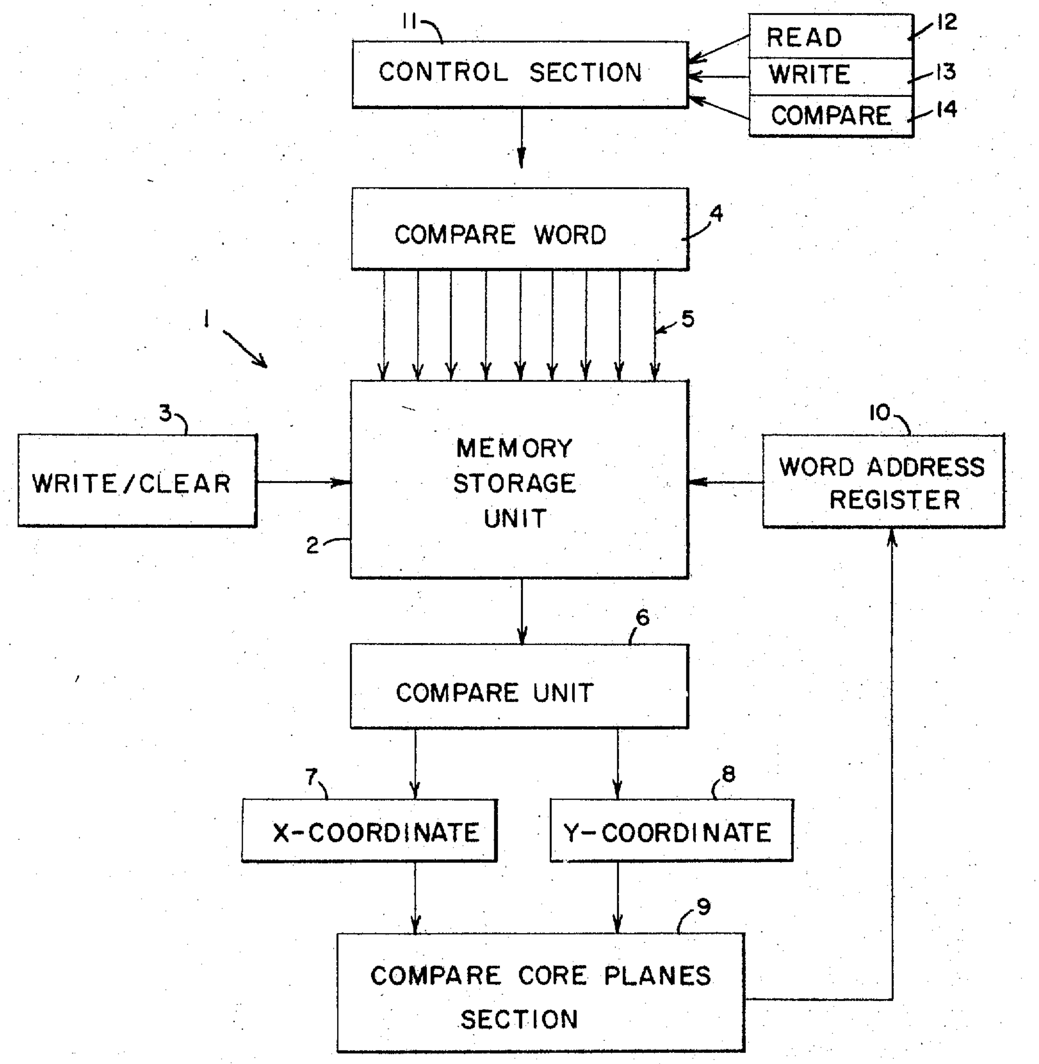

FIGURE 3 is a schematic illustration of the flux vectors in the region Y of the core of FIGURE 2 illustrating how the flux vectors change and in what direction upon the application of the interrogate pulse both with and without an external magnetic field; and FIGURE 4 is a block diagram of a suitable system to achieve the associative memory function utilizing a preferred embodiment of the memory storage unit of the invention shown in FIGURE 1.

CORE FUNCTION

In order to understand how each particular core functions, and how each core is interrogated to determine the "Exclusive OR" or "Equality" functions necessary for associative memory operation, reference should be had to FIGURES 2 and 3. Particularly, FIGURE 2 illustrates a toroidal shaped ferrite magnetic core 30 which is made from a highly permeable magentic material. Many cores of this general type are available on the market. An external non-toroidal magnetic field 31 is applied to the core 30 so as to be substantially perpendicular to the axis thereof. The magnetic field 31 will induce flux patterns through the core, as indicated by the arrows 32. A clear/wire winding 33 may be passed at any position around the core to create a desired flux pattern therearound. The external magnetic field 31 will not be of sufficient magnitude to fully change any flux pattern therearound induced by the winding 33. An interrogate winding 34 is passed in solenoidal fashion around the core 30 so as to lie in a plane substantially perpendicular to the magnetic force lines 32 from the external magnetic field 31. However, a current pulse through the interrogate winding 34 will create a magnetic field which is substantially parallel to the field 31.

In actually measuring flux changes in the core 30, it is only necessary to measure flux changes in that portion of the core designated region Y, and identified by numeral 35 which in effect represents an arcuate portion of the core under the sense winding 36 and substantially perpendicular to the magnetic field 31. A sense winding 36 is passed around this area of the core to sense all flux changes therein. Thus, the core 30 of FIGURE 2 exactly represents any one of the cores 22 in FIGURE 1.

In order to appreciate the necessity of utilizing an external magnetic field to achieve the Exclusive OR or "Equality" function, reference should be had to FIGURE 3. The upper half of FIGURE 3 schematically represents flux vectors in the region Y portion of a toroidal core which is not subject to an external magentic field. Note that an upward flux vector may represent a B bit of information whereas a downward flux vector will represent a $\overline{B}$ bit of information. If A information is passed through an interrogate winding, it may induce a magnetic field into region Y in a direction indicated by the arrows 40, as is common in cross-field switching techniques. The flux represented by arrows 40 will tend to rotate the B flux pattern in the region Y of the core a certain angle $\alpha$ indicated by numeral 41 to the right causing a measurable change in flux in region Y of $\Delta\phi$ in a downward direction. Conversely, with the $\overline{B}$ stored in the region Y and an A applied through the interrogate winding the $\overline{B}$ flux vector will again be shifted to the right to cause a similar change in the flux of $\Delta\phi$, but which will be in an upward direction, as indicated by the arrow 42. Of course, the converse happens when the B or $\overline{B}$ flux pattern stored in region Y of a core is interrogated with $\overline{A}$ pulses through the interrogate winding. Again the B flux change will be in a downward direction, as indicated by the arrow 43 while the $\overline{B}$ flux change will be in the upward direction as indicated by arrow 44. This means that only the functions $AB+\overline{A}B$ and $A\overline{B}+\overline{A}\cdot\overline{B}$ may be obtained. None of these functions are the "Exclusive OR" function and will not be applicable to an associative memory operation.

However, with reference to the bottom half of FIGURE 3, it should be noted that B and $\overline{B}$ flux vectors are displaced to the right equal amounts, indicated by angle $\theta$, which represent the amount of displacement which will take effect because the external magnetic field is applied. In this situation, A information passed through an interrogate winding to generate a magnetic field as indicated by the arrows 50 will cause displacements of the B and $\overline{B}$ flux vectors in region Y in the direction indicated by the angles $\alpha$, which again will cause $\Delta\phi$ flux displacements in the downward direction for the B flux and in the upward direction for the $\overline{B}$ flux, as indicated by arrows 51 and 52, respectively. Thus, it should be seen that the flux changes indicated by arrows 51 and 52 are greater than where no magnetic field is applied, but that they do occur in the same directions as the corresponding situations in the case where no magnetic field is applied. The change results when the $\overline{A}$ pulses are passed through the interrogate winding where the external magnetic field still deflects the B and $\overline{B}$ flux patterns in the same direction. In this instance, the $\overline{A}$ flux patterns 53 deflect the B and $\overline{B}$ flux patterns to the left by an amount indicated by angle $\alpha$ so that the resultant flux change $\Delta\phi$ for the B flux is in an upward direction indicated by arrow 54 while the resultant flux change for the $\overline{B}$ flux is in a downward direction indicated by arrow 55. This means that the following functions may be sensed where the external magnetic field is applied:

$$AB+\overline{A}\overline{B} \text{ and } A\overline{B}+\overline{A}B$$

In other words, this gives the "Exclusive OR" and the "Equality" functions one of which is necessary to perform the associated memory operation. Thus, it is seen that the utilization of the external magnetic field allows a cross field switching technique utilizing an interrogate winding wrapped in solenoidal fashion around a toroidal core to be interrogated for non-destructive readout to provide the "Exclusive OR" and "Equality" functions. This type of information from a single toroidal magnetic core utilizing cross field switching techniques is not possible where no external magnetic field is applied, as is clearly illustrated with reference to the top half of FIGURE 3, and explained above.

The invention contemplates that the external magnetic field will be about 10 times stronger than the interrogate magnetic field so as to accomplish the objects of the invention. However, the external magnetic field may be between about 1 to about 50 times larger than the interrogate magnetic field. The larger force of the external magnetic field allows the shifting of the flux pattern of the core which enables the interrogate magentic field to determine the desired logical functions. The external magnetic field should apply a magnetic force to the cores of between about 25 and about 100 oersteds to achieve the desired results. If a permanent magnet supplies the field it may contact the core to apply the desired magnetic force as the magnet will have such low permeability that contact with the core will not cause any deviation of the core flux pattern.

Any suitable means could be utilized to supply the external magnetic fields. For example, beside permanent magnets, the field might be applied by a current either to the interrogate winding or via another current carrying conductor. In other words, the external field may be either static or dynamic. However, it is important that the external magnetic field be parallel to the interrogate magnetic field.

SPECIFIC STRUCTURE OF MEMORY STORAGE UNIT

The essence of this particular invention relates to the actual construction and operation of the memory storage unit. For a better understanding of this unit, reference should be had to FIGURE 1 wherein one possible segment representing a few words is illustrated. Specifically, a base plate 20 is a permanent magnet which is a necessary element and unique feature of the structure. A thin receiving layer 21 may be provided thereover and operatively affixed thereto in any suitable manner. The storage requirements are provided by a plurality of ferrite toroidal cores, indicated generally by numeral 22, which are aligned in columns 23 and rows 24 and held in position by having a portion thereof slightly embedded in the receiving layer 21. The layer 21 may be an insulator or not as desired to achieve the proper external magnetic field at the core. It should be understood that the primary purpose of the layer 21 is to provide a means to properly position the cores 22 relative to the plate 20. The columns 23 represent bit alignment from bit ONE to bit *n* while the rows 24 represent word alignment from word ONE to word *n*. Thus, the most significant bit of word ONE would be stored in a core 25 located at the far left side of word ONE.

In order to write information into the cores 22, or to clear information therefrom, each column 23 of cores is provided with a + or −⅓ line, indicated generally by numeral 26. These + or −⅓ write lines are threaded through each bit aligned core in each column 23. Since the + or −⅓ line cannot provide enough current to produce flux changes in the cores 22, each row 24 of cores is provided with a +⅔ and reset line, indicated generally by numeral 27. Thus, it can be seen that any particular core 22 can be provided with the desired bit of information simply by energizing one particular ⅔ and reset line 27 and one particular + or −⅓ write line 26. Of course, a flux pattern is not set into any core 22 unless its particular +⅔ and reset line 27 and its + and −⅓ write line are energized with the + or −⅓ write line energized in the + direction. Thus, a ONE will be written into a core 22 when a flux pattern is induced by a +⅔ and a +⅓ write signal so the flux pattern will be in generally a clockwise direction. Conversely, ZERO will be written by the reset portion of the ⅔ and reset line 27 causing a flux pattern in the counterclockwise direction. Before any words are written into memory, all cores are rest to ZERO.

The information stored as bits represented by flux patterns in the cores 22 may then be interrogated by providing each column of cores 23 to have each core in a column surrounded by an interrogate strip line, indicated generally by numeral 28. These lines 28 must be placed substantially parallel to the base plate 20 so that they create an interrogate magnetic field substantially parallel to the external magnetic field emanating substantially perpendicular from the surface of the base plate 20. To better achieve this effect, it is contemplated that the interrogate strip line will be made from a conducting strip wound in solenoidal fashion around substantially the center of each bit aligned core in each column 23.

In order to determine the bit of information stored in each core 22 during the interrogate magnetic field generated by passing a current through the interrogate strip line 28, the invention contemplates utilizing a sense wire 29 passed through and around each core in each aligned row representing a word. It is essential to the proper operation of the storage unit that the sense wires actually sense flux changes in each core in an arcuate section of the core substantially opposite to the portion adjacent the base plate 20, or perpendicular to the magnetic field emanating therefrom, as will be more fully explained hereinafter.

Thus, it is seen in summary, that the cores 22 are aligned in bit aligned columns and rows representing words. Information is written as flux patterns into the cores by write lines passing through each bit aligned column and bit aligned row so that each individual core can be set individually to the desired flux pattern. An interrogate line is provided on each bit aligned column to generate an interrogate magnetic field to create a cross field switching technique to nondestructively change the flux in the core, as more fully explained hereinafter. This interrogate magnetic field must be parallel to the magnetic field generated by the permanent magnetic base plate 20. A sense winding 29 is provided on each core to sense flux changes in that arcuate portion of the core substantially perpendicular to the interrogation magnetic field and the external magnetic field.

GENERAL STRUCTURE

The associative memory function in a digital memory storage system is that function where a compare word is compared to every word stored in memory, with a comparison of either the entire word or only one bit taking place during one normal read cycle. Associative memories may be utilized to disclose where a compare between an external compare word and an unknown word located in memory is almost achieved or to disclose the amount of compare achieved. The word stored in memory may be partially masked or intermittently masked so that only a particular portion of each word is brought under comparison with those same portions of a compare word. Some of these specific applications are more clearly described in the above-identified patent applications.

For an understanding of the basic core structure of the invention in a memory storage unit for associative memory, reference should be had to FIGURE 4 wherein the numeral 1 indicates generally an associative memory device comprising a memory storage unit 2 with a write/clear capability 3 for storing the desired word information in the storage unit 2. In order to effect the associative memory function, a compare word 4 is bit orientated with the memory storage unit 2 by means of the plurality of feed leads, indicated generally by the numeral 5. The information achieved by sense wires on each storage element in the memory storage unit, to be more fully explained hereinafter, will provide an information signal to a compare unit 6 which will in turn determine the X and Y coordinates 7 and 8 of a particular word indicating compare stored in the memory storage unit 2. The X and Y coordinate information 7 and 8, respectively, may be sent to a compare core plane section 9 to determine the address of any and all words in the memory unit 2 corresponding to the compare word 4. This information may be sent to a word address register 10 to then select the desired compare word in the memory storage unit 2. The structure and interrogation of the planes in the compare core plane section 9 are the subject of a patent application entitled, "Resolving Multi-Responses in An Associative Memory which was filed June 30, 1963, with Ser. No. 289,196, and which also is assigned to the Goodyear Aerospace Corporation. The word address register 10 may also be used to locate any word stored in the memory storage unit 2. In order to provide operator control for the device 1, a control section 11 may be provided which includes a read function 12, a write function 13, and a compare function 14 feeding thereinto for proper selection control by the apparatus operator.

Thus, it is seen that the objects of the invention have been achieved by providing a magnetic core having a single closed flux path which utilizes cross field switching techniques with an external bias supplied by a non-toroidal magnetic field. The external bias effectively allows the core to perform the "Exclusive OR" or "Equality" logical functions with A information represented by the direction of the interrogate magnetic field and B information represented by the direction of the flux pattern stored in the core. It has been found that the external magnetic field also increases the output voltage detected by a sense winding reading flux changes in the core caused by the interrogate magnetic field as well as decreasing destructive switching time.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In an externally biased high speed non-destructive memory element to perform the logical "Exclusive OR" or Equality function the combination of a single aperture core having an axis and made from a square looped magnetic material, means to produce a flux pattern in a desired direction around the core to represent B information, means to subject a portion of the core to a uniform non-toroidal magnetic field directed substantially perpendicular to the axis of the core, means to represent A information in the form of an interrogate magnetic field around the core in a plane substantially parallel to the non-toriodal magnetic field, and means to measure the amount and direction of flux change in the core along that portion of the core subjected to the uniform non-toroidal magnetic field whereby a flux change in one direction indicates $A\overline{B}+\overline{A}B$ and a flux change in the opposite direction indicates $AB+\overline{AB}$.

2. A memory element according to claim 1 where the non-toroidal magnetic field is provided by a permanent magnet positioned so as to provide a uniform magnetic field of between about 25 and about 100 oersteds at the said portion of the core.

3. A memory element according to claim 2 where the interrogate magnetic field is between about 1 to about 1/50 times the strength of the non-toroidal magnetic field.

4. A memory storage unit comprising a planar base made from a permanent magnetized material whereby the lines of flux extend normal to the surface of the base, a plurality of single aperture cores made from a square looped magnetic permeable material positioned in aligned columns and rows on the planar base whereby the axis of the cores is substantially parallel to the plane of the base and only a short section of each core is adjacent the base, write wire means passing through the aperture of each core to set flux patterns therearound representing bits of information so that the bits of information in each row represents a word from the most significant to the least significant bit, interrogate line means surrounding each bit aligned column of cores in solenoidal fashion, which is characterized by sense line means passing through the aperture of each core adjacent said short section thereof, a compare word represented by bits of information aligned with the columns of cores in the memory unit, means to sequentially pulse the interrogate line means in the storage unit in accordance with the bit information of the compare word from the most significant bit to the least significant bit to create interrogate magnetic fields parallel to the magnetic field of the planar base, and means to read the voltage signals induced into the sense lines to determine if each bit of a word in the memory unit compares with each bit of the compare word.

5. A combination according to claim 4 where the external magnetic field is about 10 times the magnitude of the interrogate magnetic field and produces a uniform magnetic field at the short section of each core of between about 25 and about 100 oersteds.

References Cited

UNITED STATES PATENTS

| | | | |
|---|---|---|---|
| 3,214,741 | 10/1965 | Tillman | 340—174 |
| 3,287,712 | 11/1966 | Hewitt | 340—174 |
| 3,295,115 | 12/1966 | Snyder | 340—174 |

TERRELL W. FEARS, *Primary Examiner.*

VINCENT P. CANNEY, *Assistant Examiner.*